(12) United States Patent
Mizrakhi

(10) Patent No.: US 11,334,678 B2
(45) Date of Patent: May 17, 2022

(54) METHOD AND SYSTEM FOR A DISTRIBUTED COMPUTING SYSTEM

(71) Applicant: CHROMAWAY AB, Bromma (SE)

(72) Inventor: Oleksandr Mizrakhi, Lviv (UA)

(73) Assignee: CHROMAWAY AB, Bromma (SE)

( * ) Notice: Subject to any disclaimer, the term of this patent is extended or adjusted under 35 U.S.C. 154(b) by 197 days.

(21) Appl. No.: 16/628,563

(22) PCT Filed: Jul. 6, 2018

(86) PCT No.: PCT/EP2018/068421
§ 371 (c)(1),
(2) Date: Jan. 3, 2020

(87) PCT Pub. No.: WO2019/008158
PCT Pub. Date: Jan. 10, 2019

(65) Prior Publication Data
US 2020/0218823 A1 Jul. 9, 2020

(30) Foreign Application Priority Data
Jul. 6, 2017 (SE) .................................... 1750892-0

(51) Int. Cl.
*G06F 16/00* (2019.01)
*G06F 21/62* (2013.01)
(Continued)

(52) U.S. Cl.
CPC ........ *G06F 21/6227* (2013.01); *G06F 16/128* (2019.01); *G06F 16/137* (2019.01);
(Continued)

(58) Field of Classification Search
CPC .. G06F 16/182; G06F 16/1865; G06F 16/137; G06F 16/1734; G06F 16/128;
(Continued)

(56) References Cited

U.S. PATENT DOCUMENTS

| 6,118,874 A * | 9/2000 | Okamoto | .............. H04L 9/0894 380/282 |
| 7,797,342 B2 * | 9/2010 | Banks | ................... H04L 9/0894 707/783 |

(Continued)

FOREIGN PATENT DOCUMENTS

| CN | 106503992 A | 3/2017 |
| EP | 0772136 A2 * | 5/1997 |

(Continued)

OTHER PUBLICATIONS

Bijun Li et al., "SAREK: Optimistic Parallel Ordering in Byzantine Fault Tolerance", 12th European Dependable Computing Conference (EDCC), Sep. 5-9, 2016.*

(Continued)

*Primary Examiner* — Srirama Channavajjala
(74) *Attorney, Agent, or Firm* — Tucker Ellis LLP

(57) ABSTRACT

There is provided a method for synchronization of node databases in a database system, said database system comprising a plurality of validation nodes each comprising a node database, and, optionally one or more client nodes, where one of the validation nodes is a primary validation node, the primary validation node having received at least one transaction message from another validation node or a client, the transaction message comprising instructions to modify the node databases, where each of the nodes stores, in its node database, a chain of data blocks, where each data block in the block chain comprises at least a cryptographically unambiguous identifier of the previous data block.

13 Claims, 8 Drawing Sheets

Figure 1:
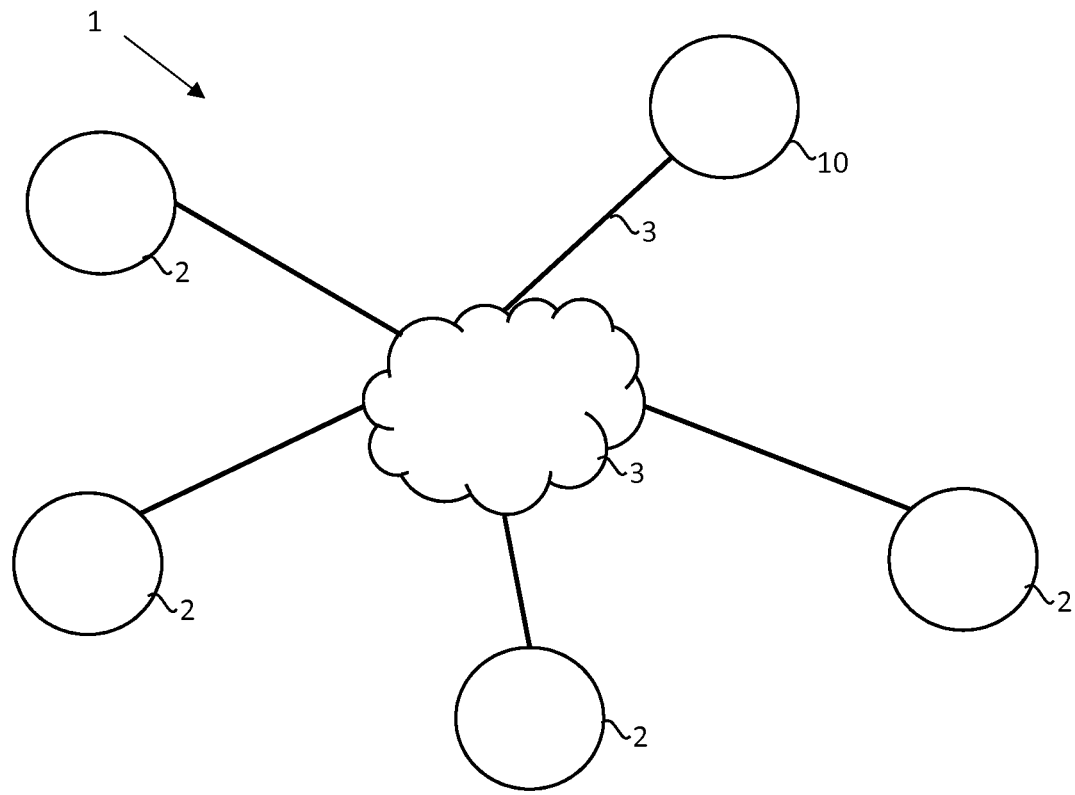

(51) Int. Cl.
  *G06F 16/182*   (2019.01)
  *G06F 16/18*    (2019.01)
  *G06F 16/13*    (2019.01)
  *G06F 16/17*    (2019.01)
  *G06F 16/11*    (2019.01)
  *G06F 21/60*    (2013.01)
  *H04L 9/06*     (2006.01)
  *H04L 9/32*     (2006.01)
  *G06F 16/23*    (2019.01)

(52) U.S. Cl.
  CPC ........ *G06F 16/1734* (2019.01); *G06F 16/182* (2019.01); *G06F 16/1865* (2019.01); *G06F 16/2358* (2019.01); *G06F 16/2379* (2019.01); *G06F 21/602* (2013.01); *H04L 9/0643* (2013.01); *H04L 9/3247* (2013.01)

(58) Field of Classification Search
  CPC .......... G06F 16/90; G06F 16/27; G06F 16/20; G06F 16/80; G06F 16/86; G06F 16/2365; G06F 16/9014; G06F 16/2315; G06F 16/24; G06F 16/24564; G06F 16/2379; G06F 16/951; G06F 16/2255; G06F 21/6277; G06F 21/602; H04L 9/064; H04L 9/3247; H04L 9/3236; H04L 9/3242; G06Q 20/3827; G06Q 20/401
  See application file for complete search history.

(56) References Cited

U.S. PATENT DOCUMENTS

| | | | | |
|---|---|---|---|---|
| 8,170,211 | B2 * | 5/2012 | Langer | H04L 9/0858 380/256 |
| 8,751,460 | B1 * | 6/2014 | Annapragada | G06F 16/951 707/684 |
| 8,775,373 | B1 * | 7/2014 | Ross | H04L 67/1002 707/612 |
| 9,430,656 | B2 * | 8/2016 | Lewis | G06F 21/755 |
| 2003/0021417 | A1 * | 1/2003 | Vasic | H04L 9/0897 380/277 |
| 2008/0183656 | A1 * | 7/2008 | Perng | G06F 16/20 |
| 2009/0271412 | A1 * | 10/2009 | Lacapra | G06F 3/067 |
| 2009/0319541 | A1 * | 12/2009 | Jaiswal | G06F 16/2255 |
| 2010/0161995 | A1 * | 6/2010 | Browning | G06F 16/20 713/189 |
| 2012/0023066 | A1 * | 1/2012 | Bourbonnais | G06F 11/1451 707/613 |
| 2014/0279959 | A1 * | 9/2014 | Marwah | G06F 16/24556 707/693 |
| 2014/0324785 | A1 | 10/2014 | Gupta | |
| 2016/0275182 | A1 * | 9/2016 | White | G06F 16/86 |
| 2017/0011074 | A1 * | 1/2017 | Douros | G06F 16/2343 |
| 2017/0011085 | A1 * | 1/2017 | Douros | G06F 16/2365 |
| 2017/0155515 | A1 * | 6/2017 | Androulaki | H04L 9/008 |
| 2017/0213209 | A1 * | 7/2017 | Dillenberger | H04L 9/3247 |
| 2017/0286951 | A1 * | 10/2017 | Ignatchenko | G06Q 20/3823 |
| 2017/0345011 | A1 * | 11/2017 | Salami | G06Q 20/10 |
| 2017/0353309 | A1 * | 12/2017 | Gray | G06F 21/51 |

FOREIGN PATENT DOCUMENTS

| | | | |
|---|---|---|---|
| WO | WO2013019892 | A1 * | 2/2013 |
| WO | WO2015166216 | A1 * | 11/2015 |
| WO | WO 2016/160416 | * | 10/2016 |
| WO | 20170004527 | A1 | 1/2017 |
| WO | WO2017023388 | A2 * | 2/2017 |
| WO | 2017040313 | A1 | 3/2017 |
| WO | 20170109140 | A1 | 6/2017 |
| WO | WO2017123902 | A1 * | 7/2017 |
| WO | WO2017204943 | A1 * | 11/2017 |

OTHER PUBLICATIONS

Du Mingxiao et al., "A review on consensus algorithm of blockchain", IEEE International Conference on Systems, Man, and Cybernetics (SMC), Oct. 5-8, 2017, pp. 2567-2572.*

International Search Report from corresponding International Patent Application No. PCT/EP2018/068421, dated Sep. 20, 2018, 3 pages.

International Preliminary Report on Patentability from corresponding International Patent Application No. PCT/EP2018/068421, dated Aug. 8, 2019, 26 pages.

* cited by examiner

| Initial state | | |
|---|---|---|
| 1: st table: records | 2:nd table: transaction messages | 3$^{rd}$ table: CUI:s |
| A1 | | # xxxxxx |
| B2 | | |
| C3 | | |
| D5 | | |

After execution of transaction message

| 1: st table: records | 2:nd table: transaction messages | 3$^{rd}$ table: CUI:s |
|---|---|---|
| A1 | D5 => D4 | # xxxxxx |
| B2 | | # yyyyyy |
| C3 | | |
| D4 | | |

Fig. 9

METHOD AND SYSTEM FOR A DISTRIBUTED COMPUTING SYSTEM

TECHNICAL FIELD

This invention relates to methods and systems for a distributed computing system, such as a distributed database, in particular to prevent failures during the processing of transactions in a distributed database, in particular the replication of data across nodes in the database.

BACKGROUND

Distributed databases are frequently used in for example banking, customer handling, purchase orders, and data communication, etc.

However, it is difficult to make a distributed database system that can tolerate network problems and node failures without losing data. In particular it is difficult to ensure so called Byzantine fault tolerance.

BRIEF SUMMARY OF THE INVENTION

In a first aspect of the invention there is provided a method for synchronization of node databases in a database system, said database system comprising a plurality of validation nodes each comprising a node database, and, optionally one or more client nodes, where one of the validation nodes is a primary validation node, the primary having received at least one transaction message from another validation node or a client, the transaction message comprising instructions to modify the node databases, where each of the nodes stores, in its node database, a chain of data blocks, where each data block in the block chain comprises at least a cryptographically unambiguous identifier of the previous data block, the method comprising the steps of, in order: a) the primary validation node making a save point for the primary node database, the save point creating a state of the primary node database to which the primary node database can be reverted to, at a later point in time, b) the primary validation node attempting to carry out the instructions in the at least one transaction message and, if attempt is successful, c) the primary storing a data block in the node database, said data block comprising 1) the at least one transaction message and, optionally 2) a cryptographically unambiguous identifier of the immediately preceding block of the block chain of the primary validation node, d) the primary creating a cryptographically unambiguous identifier of the data in the block, e) the primary sending a message to the at least one non-primary validation node, the message comprising the block and the cryptographically unambiguous identifier of the block, f) the at least one non-primary validation node receiving the message, and creating a save point for the node database, g) the at least one non-primary validation node attempting to carry out the instruction in the transaction message and, if successful, storing a data block in the database, the data block comprising the at least one transaction message and, optionally, a cryptographically unambiguous identifier of the immediately preceding block of the block chain of the non-primary validation node, h) the at least one non-primary validation node creating a cryptographically unambiguous identifier of the data in the block, i) the validation nodes removing their save points if a predetermined number of validation nodes has achieved identical blocks.

The invention allows the use (for blockchain style decentralised network) of existing implementations of relational database management systems without modification. The invention allows rules that are more complex to be enforced globally for a shared database without a central party being in control.

The invention allows guaranteed correctness for a shared database without a single party deciding what is correct. All parties that share the database are guaranteed to have correct data. Unlike blockchains, rules of validation for what is correct can be expressed with relational algebra and the many features available in relational databases. Unlike blockchains, the database management system used in the shared database can be an existing implementation of a relational database from many vendors. Unlike block chains, many of these implementations have been developed and tested for decades.

The primary may end the procedure and rolls back changes if the message is faulty in step b). The non-primary may end the procedure and rolls back changes if the message is faulty in step g).

Step a) may involve the primary, after creating the save point in step a) the primary creating a nested save point that enables rollback of a transaction, and releasing that save point if the transaction is carried out successfully in step b).

The determination if the validation nodes have achieved identical blocks may be done using a consensus algorithm. For example non-primary node may checks if the cryptographically unambiguous identifier crated in step h) corresponds to the cryptographically unambiguous identifier received in step f), and sends a message to all other validation nodes where the message is at least one of a first type of commit message sent only when the validation node has carried out step h) but not i), and the conditions for sending a the second type of commit message is not fulfilled, and a second type of commit message sent only when the validation node has received, from different nodes, a predetermined minimal number P of messages of the first type, where the removal step i) above includes a validation node releasing its save point only when a predetermined number C of commit messages of the second type has been received from different nodes, and where C>P. For example P may be 2f+1 where f is the number of tolerated failed nodes and where there are at least four nodes, and P may be 2f, where f is the number of tolerated failed nodes, and where there are at least four nodes. The commit messages of the first, second and third type may be sent repeatedly, with a predetermined minimal time interval, when conditions for sending such messages are fulfilled.

The validation nodes may repeatedly, with a predetermined minimal time interval, send out a third type of message to all other validation nodes, the third type of commit message indicating that the sending validation node is in a state where the conditions for sending the first or second type of commit messages are not fulfilled. The commit messages of first, second and third type may be signed with a digital signature.

The transaction messages may also be signed with a digital signature. The block messages may also be signed with a digital signature.

The data on which the cryptographically unambiguous identifier depends may additionally comprise a timestamp, or information about block height.

The cryptographically unambiguous identifier may be a hash.

In a second aspect of the invention there is provided a database system comprising a plurality of validation nodes each comprising a node database and, optionally one or more client nodes, where at least one validation node is capable of being a primary validation node, where the nodes are capable of exchanging transaction messages, the transaction messages comprising instructions to modify the node database, where each of the nodes stores, in its node databases, a chain of data blocks, where each data block in the block chain comprises at least a cryptographically unambiguous identifier of the previous data block, said database system configured to carry out the method according to the first aspect of the invention. The nodes of the database system may comprise messaging/blockchain software.

In a third aspect of the invention there is provided a validation node according to the second aspect of the inventing.

In a fourth aspect there is provided a data structure in a relational database comprising: a first table comprising records, a second table comprising at least one transaction message that have modified at least one record, a third table comprising CUI:s, where each CUI is a CUI of a data block, where each data block comprises at least the CUI of the immediately previously stored CUI and at least one data block comprises at least one transaction message from the second table.

The relational database may preferably be a distributed relational database.

The database system may preferably comprise a plurality of validation nodes each comprising a node database.

In a fifth aspect there is provided a block message (14) for modifying a record in a distributed relational database maintaining a block chain, the block message comprising a data block (12'a) comprising a transaction message (9) for modifying a record in a distributed relational database, and a cryptographically unambitious identifier (13'a) of the previous block (12a), said block message also comprising a cryptographically unambiguous identifier of the block (12'a).

In a sixth aspect of the invention there is provided software (8) for synchronization of node databases in a relational database system, said database system comprising a plurality of validation nodes each comprising a node database, and, optionally one or more client nodes, where one of the validation nodes is a primary validation node and where each of the nodes stores, in its node database, a chain of data blocks, where each data block in the block chain comprises at least a cryptographically unambiguous identifier of the previous data block, the software being adapted to be executed by each of the of the nodes and to exchange transaction messages between the nodes, where the transaction messages comprise instructions to modify the records of the node databases, the software being adapted to, when executed by a node which is a primary validation node, when a transaction message has been received from a node, to provide the transaction message to the node database for execution and, if execution is successful, to compute a cryptographically unambiguous identifier of a data block comprising 1) the least one transaction message and 2) a cryptographically unambiguous identifier of the immediately preceding data block of the block chain of the primary validation node, and to provide the cryptographically unambiguous identifier to the node database for storage, the software further being configured to then send a block message to at least one non-primary validation node, the block message comprising the data block and the cryptographically unambiguous identifier of the data block, and further being configured to receive commit messages from the at least one non-primary validation node, and, if at least a predetermined number of commit messages has been received, to instruct the database to remove any save points for the records.

The software may configured to, when run on a on a non-primary validation node, receive a block message from a primary validation node provide the transaction message to the node database for execution, and if execution is successful, compute a CUI of a data block, said data block comprising the at least one transaction message and the CUI of the immediately preceding block of the node, compare the CUI received in the block message from the primary validation node with the CUI computed by the node, and, if the CUI:s are the same, to send a commit message to at least one validation node.

The software may have means for electing a primary validation node.

DRAWINGS

The accompanying drawings form a part of the specification and schematically illustrate preferred embodiments of the invention, and serve to illustrate the principles of the invention.

Figure 2:
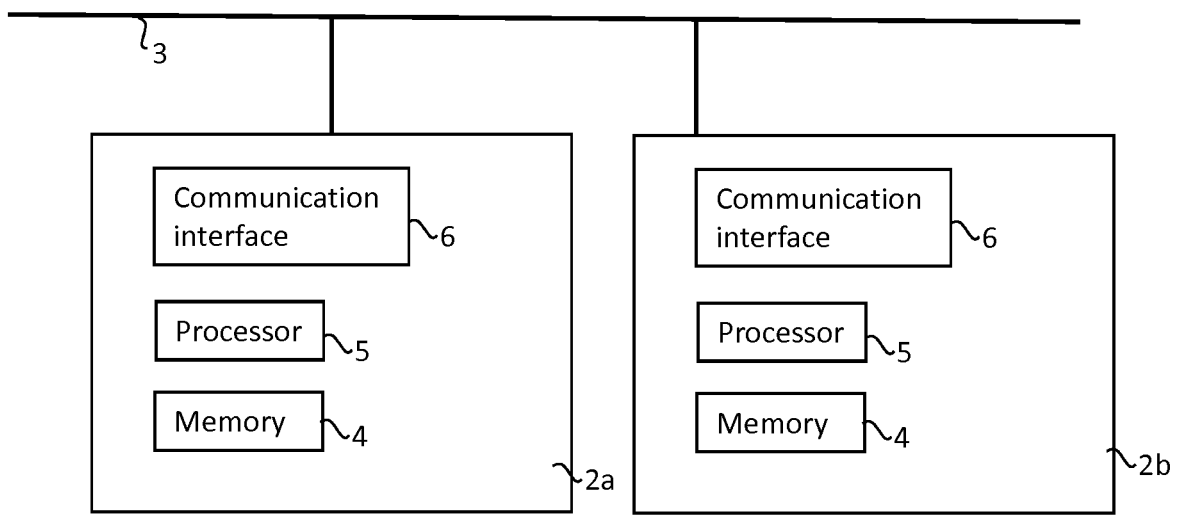
Figure 3:
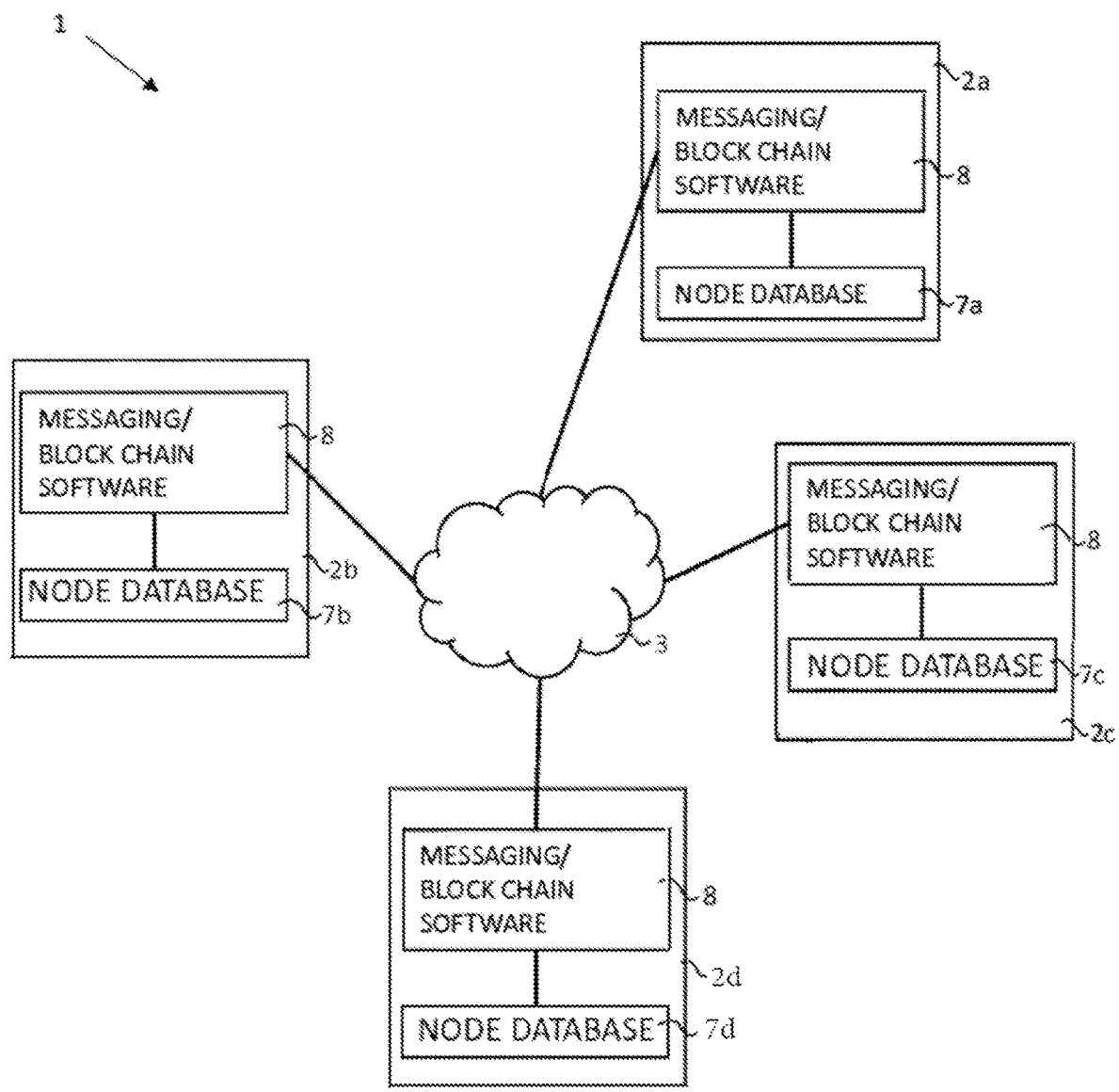
Figure 4:
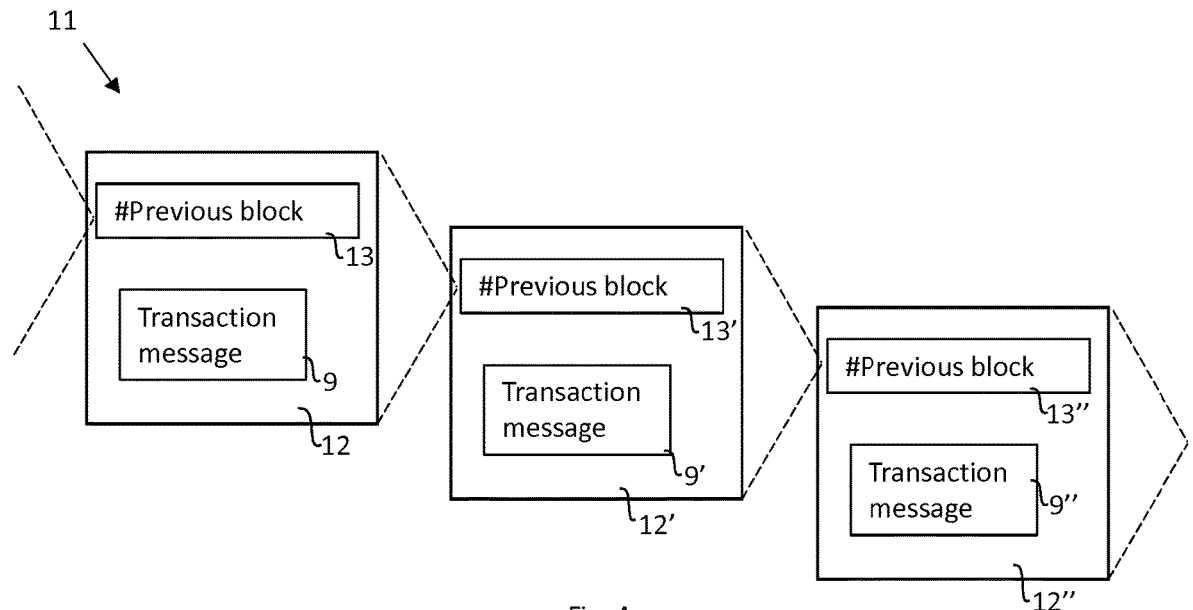
Figure 5:
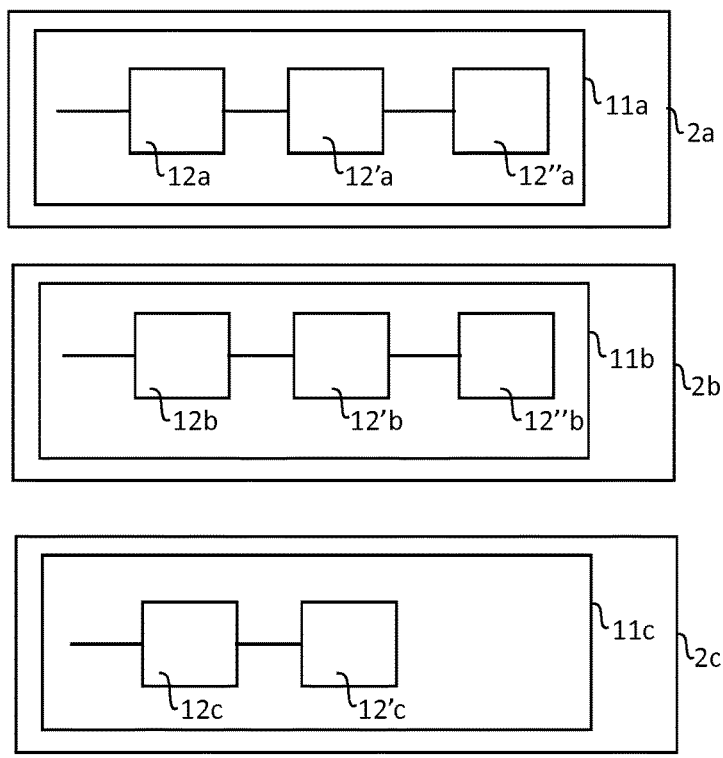
Figure 6A:
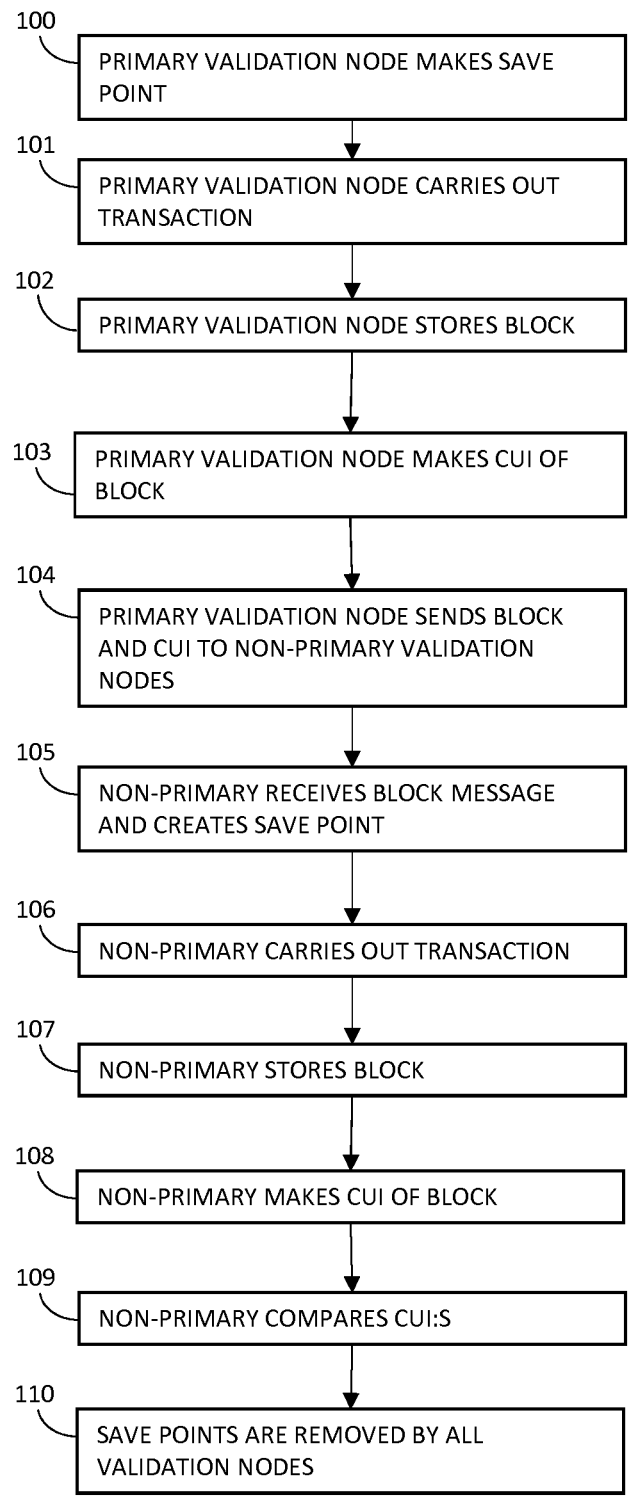
Figure 6B:
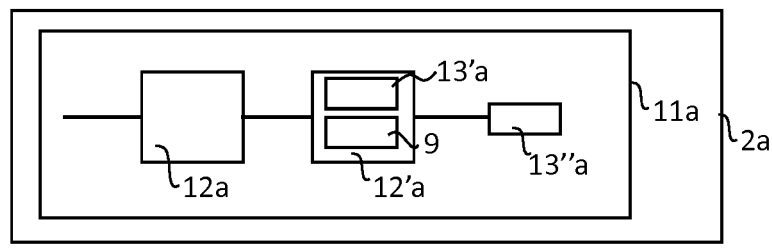
Figure 6B:
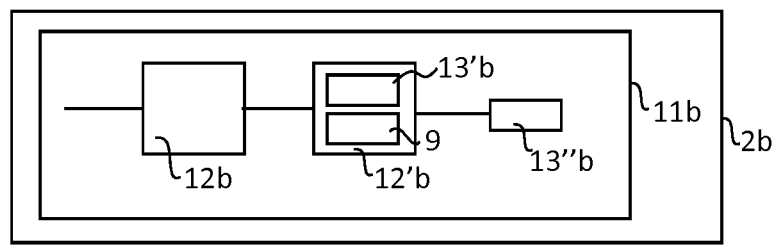
Figure 6C:
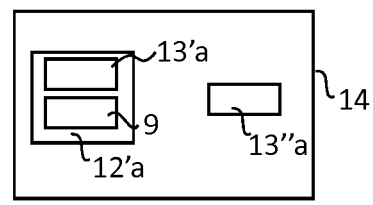
Figure 7:
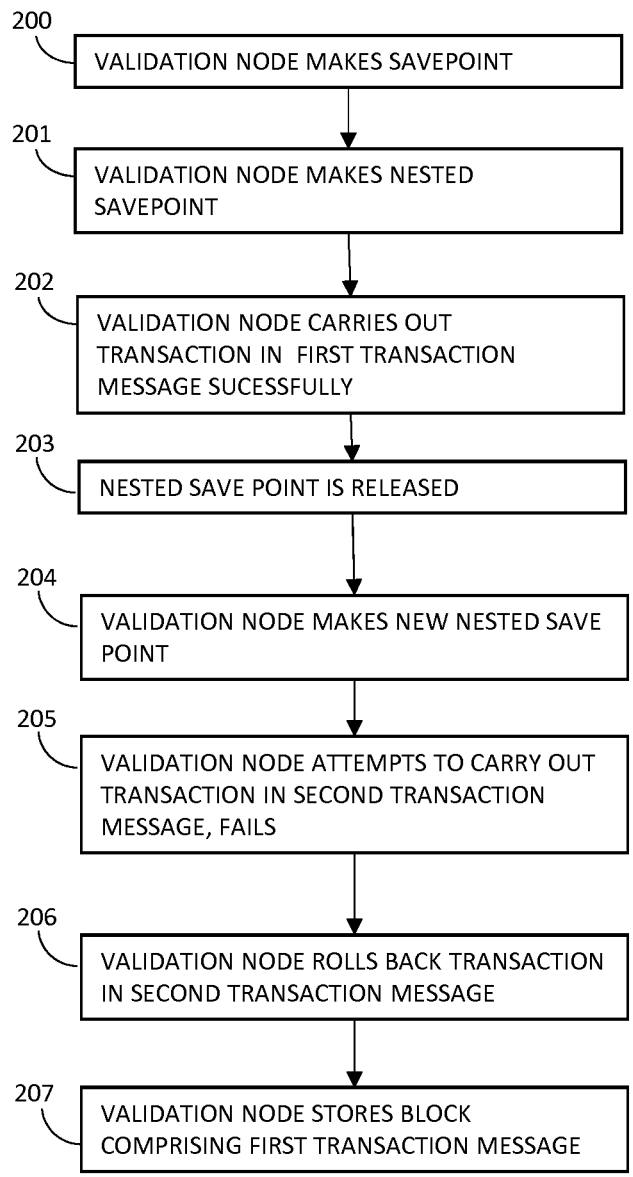
Figure 8:
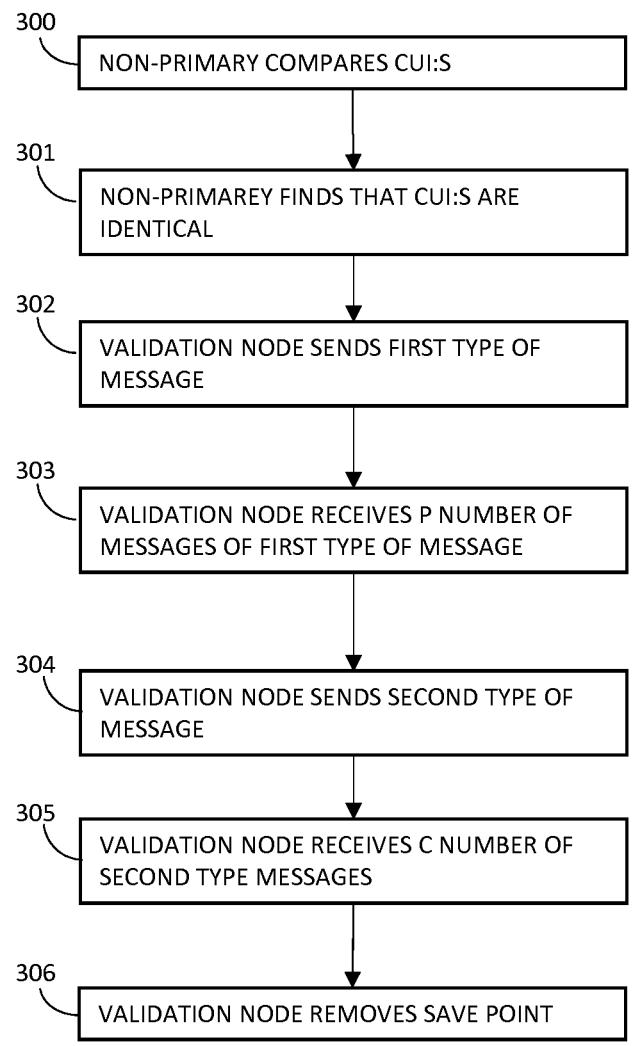

FIGS. 1-3 schematically show a system.
FIGS. 4-5 schematically show block chains.
FIG. 6a is a flow chart
FIG. 6b schematically show two block chains.
FIG. 6c schematically show a block message.
FIGS. 7-8 are flowcharts showing methods.
FIG. 9 schematically shows a data structure in a relational database.

DETAILED DESCRIPTION

With reference to FIGS. 1 to 3, a distributed database system 1 comprises a plurality of validation nodes 2a, 2b, 2c, 2d (collectively referred to as 2) connected by a network 3 so that they are able to exchange data, for example via the internet. The distributed database system 1 is preferably a relational database, for example an SQL database. A relational database is a digital database based on the relational model of data. Relational databases were first proposed by E. F. Cod in "A relational model of data for large shared data banks", Communications of the ACM, Volume 13 Issue 6, June 1970, 377-387. The relational database may store information in tables.

As seen in FIG. 2, each validation node 2 of the database system 1 has a memory 4, a processor 5 and a communications interface 6 for communication with the other nodes 2, 10. Each node 2,10 may also have a user interface comprising a display, keyboard, and the like.

The database system may be an open or a private database.

With reference to FIG. 3 the validation node 2 is configured to store a copy 7 of the database of the database system 1. The local copy 7a, 7b, 7c, 7d (collectively referred to as 7) of the database, stored in the node 2 is referred to as the node database 7 herein. Although referred to as "copy" the actual state of the different validation nodes 2 may differ slightly because of for example, lag of transactions, downtime of validation node 2 or the network 3 etc. Described herein are methods and systems to ensure that the node databases 7 are identical to a certain extent.

The purpose of maintaining the database 7 is to maintain records of data, for example bank records, a list of employees or a real estate ownership register. The node 2 is capable of receiving and storing incoming transaction messages 9, and to execute the messages 9 against the database 7. Each validation node 2 also has messaging/block chain software 8, which will be described in more detail below.

Modifications to the records of the node databases 7 are carried out using transactions messages 9 comprising instructions to modify the database 7, such as entering a new employee in a database of employees or transferring money between bank accounts. Transaction messages 9 may be exchanged between the nodes 2a, 2b, 2c, 2d.

The node database 7 is able to be modified by commands comprised in transaction messages 9. The transaction message 9 may include instructions to add or modify data records in the database 7. Transaction messages 9 are exchanged between nodes 2, 10 so that each validation node 2 can carry out the instructions in the transaction messages 9 and arrive at databases 7 with the same state. Besides validation nodes 2, there may also be client nodes 10. The client nodes 10 may propose changes to the database 7 by sending transaction messages 9 to the primary validation node 2a of the system 1 but may not execute the transaction messages 9 to the database 7. The validation nodes 2 may provide transaction messages 9 but may also carry out changes in the database 7. Optionally the system 1 also comprises read-only nodes which maintain a copy of a database 7 but cannot modify it.

A node 2, 10 should not be considered as one physical entity, but a logical entity. Thus, a node 2 can be made up of more than one computer.

Preferably there are at least two, more preferably at least three, even more preferably at least four validation nodes 2.

A validation node 2 may carry out transactions in transaction messages 9 tentatively by using save points. "Save point" is a term sometimes used for SQL databases, but as used herein, "save point" refers to any mechanism that allows changes to the database 7 to be reverted to a previous state in the database 7, much like "track changes" in Microsoft Word. Reverting the database 7 to the previous state is sometimes referred to as "rolling back" the changes.

A transaction message 9 typically has a particular allowed form. For example, digits should be entered in certain fields, letters in other fields. Another type of form requirement is that for money to be deducted from one account, the same amount must also be credited to another account. A transaction message 9 that does not have the correct form is invalid. The validation of messages 9 is therefore an important step when carrying out database transactions. During the validation process, the database software checks that the transaction message 9 is valid. Otherwise the transaction message 9 is rejected, i.e. it is not carried out. Save points allows a database node 2 to tentatively carry out a transaction, and if it is not valid, to reject the transaction and roll back the database 7 to the state of the database 7 present before the save point.

One of the validation nodes 2 is a primary validation node 2a. There are various mechanisms for electing a primary validation node 2a, and which one of the validation nodes 2a, 2b, 2c, 2d which is the primary validation node may change from time to time. For example, voting or round-robin-models have been used. If there is a fault in primary validation node 2a one of the other validation nodes 2 may discover this and "revolt" i.e. propose that a new primary is chosen. For simplicity, it is assumed herein that validation node 2a the primary validation node and that the other validation nodes are followers.

The term "cryptographically unambiguous identifier" (CUI) refers to a second set of data (the digest) derived from a first set of data (the message), where the second set of data is deterministically determined by the first set of data, and where the first set of data cannot be determined from the second set of data. Thus, even a small change of the first set of data results in a large change in the second set of data. Preferably the second set of data is much smaller than the first set of data (requires much less storage space). Examples of cryptographically unambiguous identifiers are: checksum digits and a hash, were a hash is preferred. Applying a hash algorithm to data results in the output of a fixed size bit string. One example of a frequently used hash algorithm is SHA 256. Such a CUI may serve as a "fingerprint" for the first set of data.

Each of the validation nodes 2 maintains a block chain 11 (FIGS. 4-5). Block chains 11a 11b 11c are each maintained by one validation node 2a, 2b, 2c (only three validation nodes are shown in this figure for simplify, naturally also 2d has a block chain). The block chain 11 is a chain of data blocks 12, 12', 12", where each block 12 in the block chain 11 comprises at least a cryptographically unambiguous identifier 13,13', 13" for example a hash, of data of the previous block. Since each block 12, 12', 12" contains the CUI for the previous block, a chain 11 of the blocks 12, 12', 12" is created.

Even a small change in for example block 12 would lead to a completely different CUI of the CUI of that block, and the difference would cause the later blocks 12' 12" and the CUIs of those blocks to be different also. A block 12 preferably, as seen in FIG. 4, comprises at least one transaction message 9, in which case the cryptographically unambiguous identifier will be based on the transaction message 9 as well as the cryptographically unambiguous identifier 13a of the previous block. The block 12 may also include a time stamp, block ID, such as a block serial number or data that indicate block height. Block serial numbers are assigned in the order the blocks are created, and later blocks have higher numbers. The block may also comprise a CUI of the included transaction messages 9.

The cryptographically unambiguous identifier 13 may be used to compare two blocks 12. If for example, with reference to FIG. 5, a hash (i.e. a CUI 13) of block 12"a in the block chain 11a in a node 2a, is identical to a hash of block 12"b in the block chain 11b of node 2b, it can be assumed that the states of the node databases 7a, 7b of validation nodes 2a 2b are identical.

Block chain 11c is incomplete because it has been offline. It can catch up if the primary validation node 2a sends a block message with block 12" to node 2c.

A block 12 may include information about the block ID, block height or a time stamp to facilitate comparison between blocks that are at the same height, such as 12'a and 12'b, or 12"a and 12"b. Information about block ID or block height makes it possible to know which CUI that should be compared.

The block chain may have an "artificial" first block (a "genesis block")

The table structure of a node database 7a, 7b, 7c, 7d is schematically shown in FIG. 9. The database 7a, 7b, 7c, 7d comprises at least a first table comprising records (for example a list of employees, or bank accounts) and a second table (transaction table) that comprises all the transaction messages that have modified the records. The database also comprises a third table (block table) comprising the CUI:s. Information from the second and third tables are included in the block 12.

The CUI:s in the third table are logically linked to the transaction messages 9 in the second table. For example, each CUI may be associated with one block ID, such as a block serial number, and each transaction message may also be associated with one block ID. Thus, each transaction message 9 will be associated with a block ID that is in turn associated with a CUI. Thus, every transaction message has block ID. Several transaction messages 9 may be included the same block 12 and therefor be associated with the same block ID.

The validation nodes 2 are able to send messages and to receive messages from each other, the messages indicating a state of the node database 7 in relation to the block chain 11 as described in more detail below.

A method for synchronization of node databases 7a, 7b, 7c, 7d can be carried out with reference to FIGS. 6a and 6b. In step 100 the primary validation node 2a which has received at least one previously unprocessed transaction message 9 from another validation node 2b, 2c, 2d, or a client 10 (or possible has created the transaction itself), makes a save point for the database 7a. The save point creates a state of the records of the database 7a (in the first table) to which the primary validation node database 7a can be reverted to, at a later point in time. This allows the primary validation node 2a to tentatively carry out the transaction in the transaction message 9. In step 101 the primary validation node 2a attempts to carry out the instructions in the at least one transaction message 9. If the transaction is not successful, i.e. the transaction cannot be validated, the transaction is rejected and the change to the database 7a is rolled back. The procedure is then stopped. It may start if the primary validation node 2a has a new message 9 to be processed.

If, on the other hand, the transaction is successful, the primary validation node 2a stores in step 102, in the database 7a, a data block 12'a, comprising the at least one transaction message 9 (in the second table) and, optionally, a cryptographically unambiguous identifier 13'a of the immediately preceding data block 12a of the block chain 11a of the primary validation node 2a (in the third table).

More than one transaction message 9 may be comprised in one block 12, and in that case the transaction messages 9 are preferably ordered so that they are executed in a certain predetermined order. The block 12'a may also comprise a timestamp, or information about block height (order of the block) in the block chain 11. This enables non-primary validation node 2b, 2c, 2d that receives one or more blocks 12 from the primary validation node 2a to order blocks 12 in the correct sequence. For example, if a non-primary validation node 2b, 2c, 2d is offline for a while, becomes online and receives more than one block message 14 from the primary validation node 2a, the non-primary validation node 2b, 2c, 2d needs to know in which order the block messages 14 should be processed. In step 103 the primary validation node 2a computes CUI 13"a of the data in the block 12'a, i.e. at least the transaction message 9 and the CUI 13'a of the previous block. The data on which the CUI is based may also include other information in the block 12, for example information about block height or timestamp included in the block. The CUI 13"a may be stored in the third table of the node database 7a, together with the block 12'a. In the node database, the CUI 13"a may thus be associated with the block 12'a, typically using the block ID. This can be used as a proof that the block chain 11a is correct. When the CUI is a hash the CUI 13"a is a block hash. Although the CUI can be recomputed at any time, it saves computing power to store it in the database 7.

In step 104 the primary validation node 2a sends a block message 14 to at least one non-primary validation node 2b, 2c, 2d. Typically the block message 14 is sent to a plurality of validation nodes 2b, 2c, and 2d. Preferably the block message 14 is sent to at least two, more preferably at least three, more preferably at least four validation nodes 2. The block message 14 comprises the block 12'a (the transaction message 9 and the CUI 13'a of the previous block) and the CUI 13"a (block hash) of the block 12'a in the block message 14, see FIG. 6c.

In step 105 the non-primary validation node 2b, 2c, 2d (only 2b is shown in FIG. 6b and described below but 2c and 2d carries out the same steps) receives the block message 14 and creates a save point for its node database 7b. The non-primary validation node 2b then attempts to carry out the transaction in the transaction message 9 in the data block 12'a in the block message 14, in step 106. If the transaction is successful, ie accepted by database 7b, the non-primary validation node 2b stores, in step 107, in its node database 7b, a data block 12'b, comprising the at least one transaction message 9 and, optionally, a CUI 13'b of the immediately preceding data block 12b of the block chain 11b.

In step 108 the non-primary validation node 2b creates a cryptographically unambiguous identifier 13"b of the data in the block 12'b. The CUI 13"b may be stored in the third table of the database 7b together (i.e. logically linked to) with the block 12'b. The state of the block chains 11a 11b at this step is shown in FIG. 6b. In step 109 the at least one non-primary validation node 2b compares the blocks 12'a 12'b by comparing CUIs. For example, if the CUI is a hash, the non-primary validation node 2b checks if the created hash 13"b is the same as the hash 13"a received with the block message 14 from the primary validation node 2a in step 105. If the CUI 13 that it has arrived to itself (CUI 13"b) based on its own block chain in step 108 is identical to the CUI 13"a received with the block message 14 in step 105 the non-primary validation 2a node can treat the transaction message 9 as correct and proceed to commit the database 7b. If the block 12 is correct save points created in step 100 and 105 are removed by all validation nodes 2 in step 110. This can be done in various manners, for example with a consensus algorithm. For example, it can be required that a certain minimal number of validation nodes 2 reaches the same CUI for a block to be treated as correct if the process gets stuck because consensus cannot be reached (for example because the minimal number of first type commit messages or second type commit messages are not received, see below) the tentatively made blocks 12'a and 12'b and the database changes are rolled back to the save point made in steps 100 and 105.

The method results in a data structure schematically shown in FIG. 9, comprising a first table (record table) with records, of which some has been modified in a permanent manner, a second table comprising at least one transaction message that has been used to modify a record in a permanent manner and a third table (block table) comprising the CUIs. Naturally the block table may also comprise the other information comprised in the block and described above such as block id, CUI of previous block, timestamp. This is typically included in the third table. Looking at FIG. 9, in the initial state (upper table) the record D is associated with 5. A transaction messages changes so that D is instead associated with 4. The result is shown in the lower table where the transaction message is shown in the second table. The third table comprises the CUI of the transaction message in the second table and the CUI of the immediately preceding block. The block IDs that are used for logically associating the second table with the third table are not shown.

The blockchain 11 and messaging steps are carried out by messaging/block chain software 8. Messaging/blockchain software 8 may carry out the following:

1. Handles communications between validation node 2 and clients 10. This is important because database 7 will thereby not be exposed to other nodes.
2. Handles communications with other validation nodes 2.
3. Decodes (parses) transactions messages 9.
4. Checks digital signatures.
5. Applies transactions to database 7 in order.
6. Adds raw client transactions and CUI 13 to database 7.
7. Commits data to database 7 only once consensus is reached.

This has the advantage that the database developer does not need to care about communication security, message formats, digital signatures, ordering, and consensus. He just describes what operations are possible in what condition, and then the messaging/blockchain software 8 ensures that only operations which are properly authorized will reach the database 7. The messaging/blockchain software 8 treats database as a black box: it doesn't care about specifics of operations and schemas. Messaging/block chain software 8 may be implemented in Java while the database may be implemented in for example in SQL.

Steps 100 and 105 may involve the use of nested save points, in particular when there are a plurality of transaction messages 9. This allows a validation node 2, preferably a primary validation node 2a, to tentatively carry out more than one transaction before making a block 12. Only those transactions that are valid are included in the block 12 and the others are rejected. An example is shown in FIG. 7 where the primary validation node 2a has received two transaction messages. In step 200 the primary validation node 2a that has received a plurality of transaction messages 9 makes a save point for the database 7a as in step 100, above. In step 201 the primary validation node 2a makes a nested save point that allows rollback of individual transaction messages 9. In step 202 the first transaction is carried out successfully. The nested save point made in step 201, is then released in step 203. This has the consequence that the first transaction will be included in the next block 12. In step 204 the primary validation node 2a makes a new nested save point. The primary validation node 2a tries to carry out the second transaction in step 205, but fails, perhaps because the second transaction message has the wrong form, or for some other reason. The second transaction is then rolled back in step 206. The first transaction carried out in step 202 is not rolled back. It is included in the block 12 in step 207. The second transaction message is not included in the block 12.

The save point made in step 200 is not released until the transactions are committed to all nodes 2a, 2b, 2c 2d of the database system 1, for example with the use of a consensus algorithm.

A consensus algorithm is one known way to commit the distributed database system 1. In one embodiment, of which an example is shown in FIG. 8, it is carried out as follows. Again, the figure shows the method primarily from the point of view of one of the non-primary validation nodes, 2b. The non-primary validation node 2b in step 300 checks that the CUI 13 created in step 108 corresponds to the CUI 13 received in step 105. Step 300 is carried out as in step 109. In step 301 the non-primary validation node 2b finds that the CUIs 13"a and 13"b are identical. The non-primary validation node 2b, then, if the CUIs are the same, sends a first type of commit message to all other validation nodes in step 302. The first type commit message may be sent repeatedly with a predetermined time interval when the conditions for sending the first type of commit message is fulfilled. Because the primary 2a has sent the block message 14 to a plurality of validation nodes 2b, 2c, 2d a plurality of validation nodes 2b, 2c, 2d will start carrying out the steps 105-109, and a plurality of validation nodes 2b, 2c, 2d will send the first type of commit message (provided that the CUIs 13"a and 13"b are the same, i.e. the block message 14 is correct). When a validation node 2 has received, in step 303, from different validation nodes, a predetermined minimal number P of commit messages of the first type, the validation node 2a, 2b, 2c, 2d sends a second type of commit message in step 304. The second type commit message may be sent repeatedly with at a predetermined time interval when the conditions for sending the second type of commit message is fulfilled. Commit messages of the first type is not sent when the conditions for sending the second type commit message is fulfilled. When a validation node 2a, 2b, 2c, 2d has received, in step 305, a minimal number C of commit messages of the second type from different validation nodes, the validation nodes 2a, 2b, 2c, 2d removes, in step 306, the save points created in step 100 and 105 thereby committing the changes to the node databases 7a 7b 7c 7d. C should be chosen so that it is larger than P. For example, P may be 2f and C may be 2f+1 where f is the number of tolerated failed validation nodes, and where there are at least four validation nodes.

"From different validation nodes" means that two commit messages of the first or second type received from the same node, regarding the same block, only counts as one message.

A validation node 2 may repeatedly, with a minimal predetermined time interval, send a third type of message when the conditions for sending the first or second type of commit messages are not fulfilled, for example when the node is carrying out steps 105-109.

A commit message includes at least information that identifies the sending node in the network and the status (first, second or third type). The commit message may also include CUI 13 (hash) of current block, information about block height and block ID such as block serial number. The commit message may also change request for view change (revolting).

The third type of message can be used for 1) electing a new primary (since the nodes 2 see at what height and round other nodes are, and whether they are revolting) and 2) detect if node is behind and needs to sync.

The predetermined time interval for sending messages of the first, second and third type may be a minimal predetermined time interval. The predetermined minimal time interval may be for example 30 seconds, more preferably 10 seconds more preferably 5 seconds and most preferably 1 second. The predetermined minimum time interval may be at most seconds, more preferably at most 10 seconds, more preferably at most 5 seconds and most preferably at most 1 second.

Sending the commit messages repeatedly is actually more efficient than sending them once and keeping track of what was received by a recipient.

The transaction messages 9, the block messages 14 and the commit messages of the first, second and third type may be signed by the sending node with a digital signature. Any suitable method may be used, for example methods used in cryptography. Transaction messages may be signed by the client node 10.

While the invention has been described with reference to specific exemplary embodiments, the description is in general only intended to illustrate the inventive concept and should not be taken as limiting the scope of the invention. The invention is generally defined by the claims.

The invention claimed is:

1. A method for synchronization of node relational databases in a relational database system, said relational database system comprising a plurality of validation nodes each comprising a node relational database and, optionally, client node, where one of the plurality of validation nodes is a primary validation node, the primary validation node having received at a transaction message from another validation node or the client node, the transaction message comprising an instruction to modify the node relational databases, where each of the validation nodes stores, in its node relational database, a chain of data blocks, where each data block in the chain of data blocks comprises at least a cryptographically unambiguous identifier of a previous data block, each block further comprising one or more ordered transaction messages, the method comprising:
   a) the primary validation node making a save point for a primary validation node relational database of the primary validation node, the save point creating a state of the primary validation node relational database to which the primary validation node relational database can be reverted to, at a later point in time, so that the primary validation node can carry out the instruction in the transaction message and later roll back the primary validation node relational database to the state of the primary validation node relational database present before the save point,
   b) the primary validation node attempting to carry out the instruction in the transaction message and, if the attempt to carry out the instruction is successful:
   c) the primary validation node storing a data block in the primary validation node relational database, said data block comprising the at least one transaction message,
   d) the primary validation node creating a cryptographically unambiguous identifier (CUD) of the data in the block,
   e) the primary validation node sending a block message to a non-primary validation node of the plurality of validation nodes, the block message comprising the data block and the cryptographically unambiguous identifier of the data block,
   f) the non-primary validation node receiving the block message, and creating a save point for a non-primary validation node relational database of the non-primary validation node, the save point creating a state of the non-primary validation node relational database to which the non-primary validation node relational database can be reverted to at a later point in time so that the non-primary validation node tentatively can carry out the instruction in the transaction message and later roll back the non-primary validation node relational database to the state of the non-primary validation node relational database present before the save point,
   g) the non-primary validation node attempting to carry out the instruction in the transaction message in the block message so as to arrive at a non-primary validation node relational database that is the same as a state of the primary validation node relational database and, if successful, storing a data block in the non-primary validation node relational database, the data block comprising the at least one transaction message,
   h) the non-primary validation node creating a cryptographically unambiguous identifier of the data in the data block,
   i) the primary and non-primary validation nodes removing their respective save points based on a predetermined number of the plurality of validation nodes having achieved identical blocks, wherein a determination of whether the primary and non-primary validation nodes have achieved identical blocks comprises using a consensus algorithm,
   wherein the non-primary validation node checks whether the cryptographically unambiguous identifier created in step h) corresponds to the cryptographically unambiguous identifier received in step f), and sends a commit message to the plurality of validation nodes wherein the commit message comprises at least one of:
      i. a first type of commit message sent only when the non-primary validation node has carried out step h) but not i), and the conditions for sending the second type of commit message is not fulfilled,
      ii. a second type of commit message sent only when the validation node has received, from different validation nodes, a predetermined minimal number P of commit messages of the first type,
   wherein step i) comprises a validation node releasing its save point only when a predetermined number C of commit messages of the second type has been received from different validation nodes, and where C>P,
   wherein each of the plurality of validation nodes repeatedly, with a predetermined minimal time interval, sends out a third type of commit message to all other validation nodes of the plurality of validation nodes, the third type of commit message indicating that the validation node sending the third type of commit message is in a state wherein conditions for sending either the first and/or the second type of commit messages are not fulfilled.

2. The method of claim 1 wherein the primary validation node making the save point for the primary validation node relational database comprises the primary validation node, after creating the save point, creating a nested save point that enables rollback of a transaction, and releasing that the nested save point if the transaction is carried out successfully.

3. The method of claim 1 where each of the validation nodes repeatedly, with a predetermined minimal time interval, sends out the commit messages of the first or second type to all other validation nodes, when conditions for sending such messages are fulfilled.

4. The method according to claim 1 where the transaction messages are signed with a digital signature.

5. The method according to claim 1 where the data on which the cryptographically unambiguous identifier depends, additionally comprises a timestamp, or information about block height.

6. The method according to claim 1 where the cryptographically unambiguous identifier is a hash.

7. The method according to claim 1 where the primary validation node ends the procedure and rolls back changes if a validation of the transaction message is faulty in the step b).

8. The method according to claim 1 where the non-primary validation node ends the procedure and rolls back changes if the transaction message is faulty in step g).

9. The method according to claim 1, wherein said each of said node relational databases comprises:
   a first table comprising database information records;
   a second table comprising at least one transaction message that have modified at least one of said records; and a third table comprising a plurality of cryptographically unambiguous identifiers (CUIs), where each CUI is a CUI of a data block, wherein each data block comprises at least the CUI of an immediately previously stored data block and at least one data block comprises at least one transaction message from the second table.

10. The method according to claim 9, wherein each CUI in the third table is logically linked to one or more of the transaction messages in the second table.

11. A relational database system comprising a memory device, a processor operatively coupled with the processor, a plurality of validation nodes each comprising a node relational database, each node relational database being a replicated copy of one of the same relational database and, optionally a client node, where at least one of the plurality of validation nodes is capable of being a primary validation node, where the plurality of validation nodes are capable of exchanging a transaction message comprising an instruction to modify the node relational database, where each of the validation nodes stores, in its node relational database, a chain of data blocks, where each data block in the chain of data blocks comprises at least a cryptographically unambiguous identifier of a previous data block, wherein:

the primary validation node is operable to make a save point for a primary validation node relational database of the primary validation node, the save point creating a state of the primary validation node relational database to which the primary validation node relational database can be reverted to, at a later point in time, so that the primary validation node can carry out the instruction in the transaction message and later roll back the primary validation node relational database to the state of the primary validation node relational database present before the save point, the primary validation node is operable to attempt to carry out the instruction in the transaction message and, if the attempt is successful:

the primary validation node stores a data block in the primary validation node relational database, said data block comprising the at least one transaction message;

the primary validation node creates a cryptographically unambiguous identifier (CUD) of the data in the block;

the primary validation node sends a block message to a non-primary validation node of the plurality of validation nodes, the block message comprising the data block and the cryptographically unambiguous identifier of the data block;

the non-primary validation node is operable to receive the block message, and creates a save point for a non-primary validation node relational database of the non-primary validation node, the save point creating a state of the non-primary validation node relational database to which the non-primary validation node relational database can be reverted to at a later point in time so that the non-primary validation node tentatively can carry out the instruction in the transaction message and later roll back the non-primary validation node relational database to the state of the non-primary validation node relational database present before the save point;

the non-primary validation node is operable to attempt to carry out the instruction in the transaction message in the block message so as to arrive at a non-primary validation node relational database that is the same as a state of the primary validation node relational database and, if successful, storing a data block in the non-primary validation node relational database, the data block comprising the at least one transaction message;

the non-primary validation node is operable to create a cryptographically unambiguous identifier of the data in the data block; and the primary and non-primary validation nodes are operable to remove their respective save points based on a predetermined number of the plurality of validation nodes having achieved identical blocks, wherein a determination of whether the primary and non-primary validation nodes have achieved identical blocks comprises using a consensus algorithm, wherein the non-primary validation node is operable to check whether the cryptographically unambiguous identifier created in step h) corresponds to the cryptographically unambiguous identifier received in step f), and sends a commit message to the plurality of validation nodes wherein the commit message comprises at least one of:

i. a first type of commit message sent only when the non-primary validation node has carried out step h) but not i), and the conditions for sending the second type of commit message is not fulfilled, ii. a second type of commit message sent only when the validation node has received, from different validation nodes, a predetermined minimal number P of commit messages of the first type, wherein step i) comprises a validation node releasing its save point only when a predetermined number C of commit messages of the second type has been received from different validation nodes, and where C>P, wherein each of the plurality of validation nodes are operable to repeatedly, with a predetermined minimal time interval, send out a third type of commit message to all other validation nodes of the plurality of validation nodes, the third type of commit message indicating that the validation node sending the third type of commit message is in a state wherein conditions for sending either the first and/or the second type of commit messages are not fulfilled.

12. A non-transitory computer readable memory storing software thereon that when executed by a computer performs a method for synchronization of node relational databases in a relational database system, said relational database system comprising a plurality of validation nodes each comprising a node relational database, and, optionally a client node, where one of the plurality of validation nodes is a primary validation node and where each of the nodes stores, in its node relational database, a chain of data blocks, where each data block in the chain of data blocks comprises at least a cryptographically unambiguous identifier of a previous data block, each block further comprising one or more ordered transaction messages, the software being executed by processors of each of the nodes and to exchange transaction messages between the nodes, where each transaction message comprises an instruction to modify the records of the node relational databases, the software being adapted to, when executed by a node which is a primary validation node, when a transaction message has been received from a node, the software being executed to make a save point for a primary validation node relational database of the primary validation node, the save point creating a state of the primary validation node relational database to which the primary validation node relational database can be reverted to, at a later point in time, so that the primary validation node can carry out said instruction in said transaction message and later to roll back the primary validation node relational database to the state of the primary validation node relational database present before the save point, the software being executed to provide the transaction message to the node relational database for attempting to carry out the instruction in the transaction message and, if the attempt to carry out the instruction is successful, to compute a cryptographically unambiguous identifier of a data block comprising 1) the least one transaction message and 2) a cryptographically unambiguous identifier of the immediately preceding data block of the block chain of the primary validation node, to store the data block in the primary validation node relational database and to provide the cryptographically unambiguous identifier to the node relational database for storage, the software being executed to
send a block message to at least one non-primary validation node, the block message comprising the data block and the cryptographically unambiguous identifier of the data block, the software being executed to receive commit messages from the at least one non-primary validation node, and, if at least a predetermined number of commit messages has been received, to instruct the relational database to remove any save points for the records, the software being executed to cause the non-primary validation node to check whether the cryptographically unambiguous identifier corresponds to the cryptographically unambiguous identifier received, and sends a commit message to the plurality of validation nodes wherein the commit message comprises at least one of:
  i. a first type of commit message sent only when the non-primary validation node has carried out creating a cryptographically unambiguous identifier of the data in the data block but not the primary and non-primary validation nodes removing their respective save points, and the conditions for sending the second type of commit message is not fulfilled,
  ii. a second type of commit message sent only when the validation node has received, from different validation nodes, a predetermined minimal number P of commit messages of the first type,
  wherein step i) comprises a validation node releasing its save point only when a predetermined number C of commit messages of the second type has been received from different validation nodes, and where C>P, the software being executed to cause each of the plurality of validation nodes repeatedly, with a predetermined minimal time interval, sends out a third type of commit message to all other validation nodes of the plurality of validation nodes, the third type of commit message indicating that the validation node sending the third type of commit message is in a state wherein conditions for sending either the first and/or the second type of commit messages are not fulfilled.

13. The non-transitory computer readable memory according to claim 12, wherein the software is run on a on a non-primary validation node, which is configured to:
receive a block message from a primary validation node,
provide the transaction message to the node relational database for execution, and if execution is successful, compute a cryptographically unambiguous identifier (CUI) of a data block, said data block comprising the at least one transaction message and the CUI of the immediately preceding block of the node, and
comparing the CUI received in the block message from the primary validation node with the CUI computed by the node, and, if the CUI:s are the same, to send a commit message to at least one validation node.

* * * * *